US005954141A

United States Patent [19]

Li et al.

[11] Patent Number: 5,954,141

[45] Date of Patent: Sep. 21, 1999

[54] AIR DRIVEN MOTOR FOR A TOOL

[76] Inventors: Fen-Lien Li; Jenn-Long Shiau, both of No. 84, Tuz Chih Street, Taichung, Taiwan

[21] Appl. No.: 08/934,631

[22] Filed: Sep. 22, 1997

[51] Int. Cl.[6] .............................. B25D 15/00; B23Q 5/06

[52] U.S. Cl. ........................... 173/93.5; 173/93; 173/109

[58] Field of Search .......................... 173/93, 93.5, 93.6, 173/109

[56] References Cited

U.S. PATENT DOCUMENTS

| | | | |
|---|---|---|---|
| 3,156,334 | 11/1964 | Hoza | 173/93.6 |
| 3,533,479 | 10/1970 | Madsen et al. | 173/93.5 |
| 3,848,680 | 11/1974 | Legler | 173/93.5 |
| 4,175,408 | 11/1979 | Kasai et al. | 173/93.5 |
| 4,817,736 | 4/1989 | Ono | 173/93 |
| 4,838,133 | 6/1989 | Dainin | 173/93.5 |
| 5,080,181 | 1/1992 | Tatsuno | 173/93.5 |

*Primary Examiner*—Scott A. Smith
*Attorney, Agent, or Firm*—Rosenberg, Klein & Bilker

[57] ABSTRACT

The present invention relates to a motor for an air-tool. More particularly, the present invention is directed to an air driven motor in which the rotor has a plurality of recesses formed between each pair of adjacent vane holding slots. A separator fine is fixed in each recess. Each vane of the rotor is radially displaceable and outwardly biased to expose a compressed air contact surface area. The separator fins add additional compressed air contact surface areas.

1 Claim, 5 Drawing Sheets

AIR DRIVEN MOTOR FOR A TOOL

BACKGROUND OF THE INVENTION

1. Field of the Invention

The present invention relates to an air-tool, and more particularly to a tool that is driven by a pneumatic actuator.

2. Description of Prior Art

In accordance with the conventional pneumatic actuator that takes compressed air as a power source, by means of a pneumatic rotary vane motor, output a twisting moment, as shown on FIG. 6, which comprises a main holder 40 having a container 41 holding a pneumatic cylinder 50, said pneumatic cylinder 50 has a chamber 52 with a rotor 60 mounted slightly off-centre, said rotor 60 is mounted on a bearing of a back cover-plate with one end, and a drive unit 70 with a spline shaft 61 to drive an output shaft drive rod 71 for connecting with variety socket heads or other tools to screw down or off bolt or to do other purposes.

Said rotor 60 of the air-tool has a symmetrical number of radial slots 62 fitted with sliding vanes 63, referring to FIG. 7, the compressed air in the main holder 40 enters the chamber 52 inside of the pneumatic cylinder 50 via inlets to push the sliding vanes 63 further to bring the rotor 60 into spinning with high-speed, by the high-speed spinning, the centrifugal force throws the vanes outward against the chamber wall so that the front face area is increased to generate the twisting power, the twisting moment is output through the spline shaft 61 to drive the drive rod 71 of the drive unit 70 output. But there are some shortcomings existing in above-mentioned conventional air-tool as follows:

1. As we know, the force of torsion on the rotor 60 has a direct relationship to the pressure of the compressed air P and the area of front face of the vanes 63, as $F=P\times A$, obviously the force of the torsional force depends directly on the front face area as the area of the vane 63 extending out from the slot 62; in the still time, most of the vane 63 is hidden into the slot 62, just only a small area faces to the compressed air as primary time of starting, so the force of the twisting on the rotor 60 is not enough strong to drive the rotor rotating, hence a lag phase is often kept till the compressed air pushes almost all the vanes 63 to increase the force on the rotor 60;
2. Due to the round surface of the rotor master shaft, the front face area just only is the area of the vane 63 extending out from the slot 62, so the rotor master shaft is only to increase the weight further to increase the resistance moment as starting;
3. Because some viscous lubricating-oil is coated between the slots 62 and the sliding vanes 63, in the starting time, the rotor 60 rotates under a lower-speed, the centrifugal force is not enough to throw the vanes 63 outward, adding the viscosity resistance of the lubricating-oil, the sliding vanes 63 can not rapidly slide out to increase the front face area, this is a sake of causing the lag phase of running;
4. For increasing the front face area to improve the outputting torsional force, some designers believe that increasing the number of the vanes 63 on the rotor 60 can solve the problem, but when the number increases over a proper amount, it not only can not obtain more twisting force, but also the vanes are unable to stand under a high torsion moment, because along with increasing the number, the width of the slot 62 and the thickness of the vane 63 are decreasing so that the intensities of the vanes 63 and the rotor 60 are reduced;
5. Due to above-described increasing the number of the vanes 63, the space length between the vanes 63 is so small that the effective front face area of the vanes 63 is reduced, the output twisting moment is reduced too;
6. As above-described, when the rotor 60 spins under a high-speed, the ends of the sliding vanes 63 are thrown against the chamber 52 wall by the centrifugal force, and sliding on it to wear the chamber wall under the friction; along with increasing the number of the vanes 63, the friction are increasing too, therefore the service life of the chamber 52 and the vanes 63 will be shorted relatively;
7. A bit of moistness and dirty dust will be carried into the compressed air entering into the chamber 52 to heap upon the joint gap between the vanes 63 and the slot 62 over a long time so that the vanes 63 will be blocked in the slots 62.

OBJECTS AND SUMMARY OF THE INVENTION

It is therefore a main object of the present invention to provide an air-tool in which the rotor has greater front face area to create stronger force of twisting, meanwhile the weight of the rotor is reduced to decrease the weight resistance moment, so that the lag phase is eliminated.

It is another object of the present invention to provide an air-tool in which a torque driver is built in the drive unit to strengthen the intensity of the structure and to increase the torsional force, and to reduce the vibration.

This object is achieved by an air-tool in which the rotor has proper number of front face recesses formed between the adjacent slots, and between the front face recesses a separator fin; the vane has a notch formed at the bottom side for catching an elastomer in to push the vane outward in order to obtain the greatest front face area in the starting time, due to the elastomer, the viscous lubricating-oil is replaced so that the vanes slide in the slots of the rotor smoothly. In the drive unit, a couple of torque blocks are set to drive the drive rod by pushing a pair of bear lugs with a pair of thrust lugs to transfer the torsional moment.

DETAILED DESCRIPTION OF PREFERRED EMBODIMENTS

Figure 1:
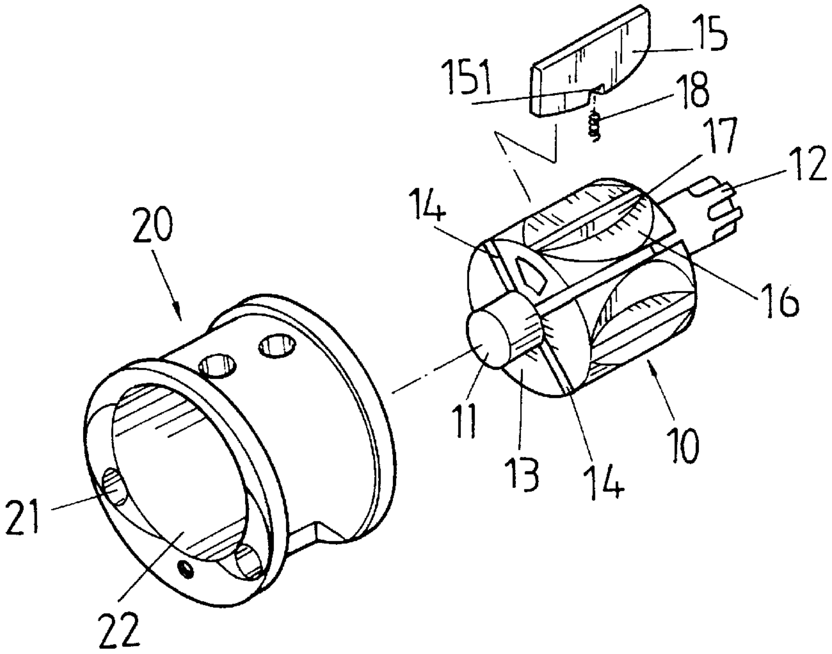
FIG. 1 is an exploded view showing a rotary vane motor of the present invention.
Figure 2:
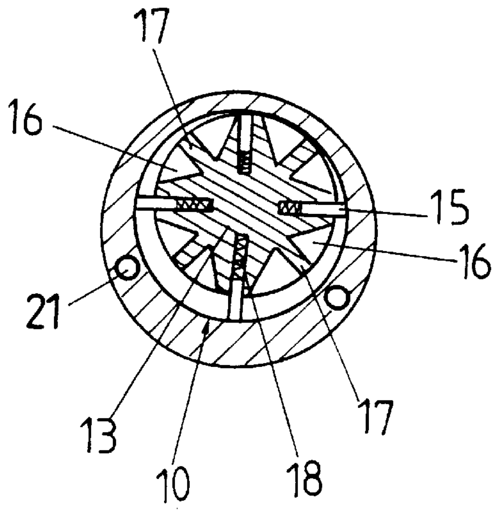
FIG. 2 is a cross-section view showing the rotary vane motor of the present invention.
Figure 3:
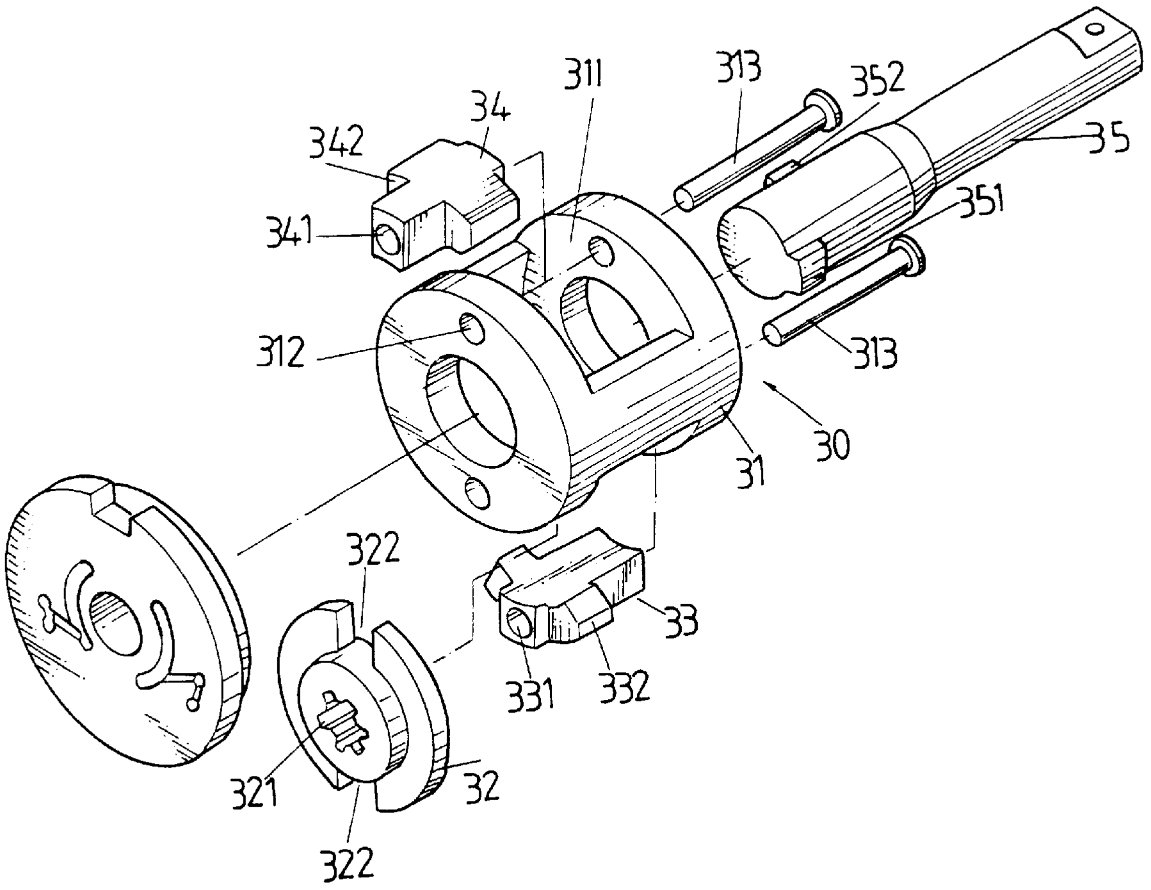
FIG. 3 is an exploded view showing the drive unit of the present invention.
Figure 4:
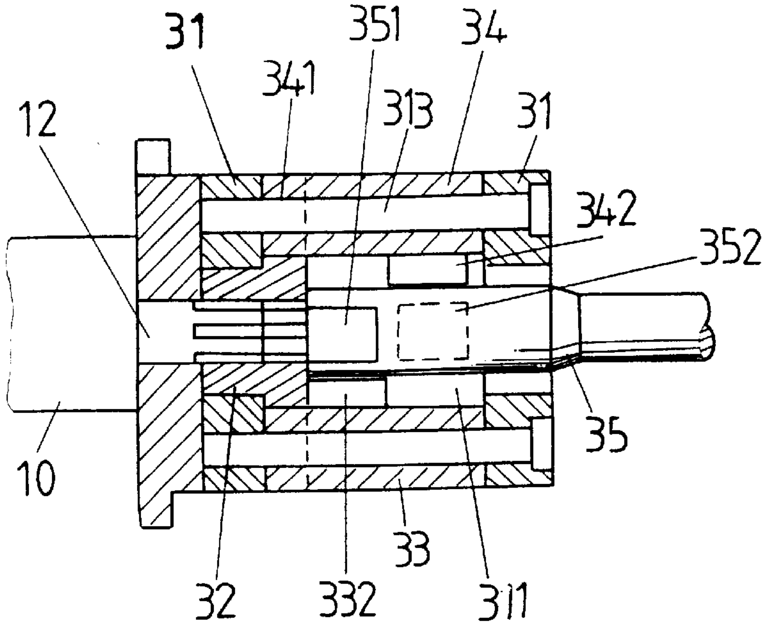
FIG. 4 is an axial section view showing the drive unit of the present invention.
Figure 5:
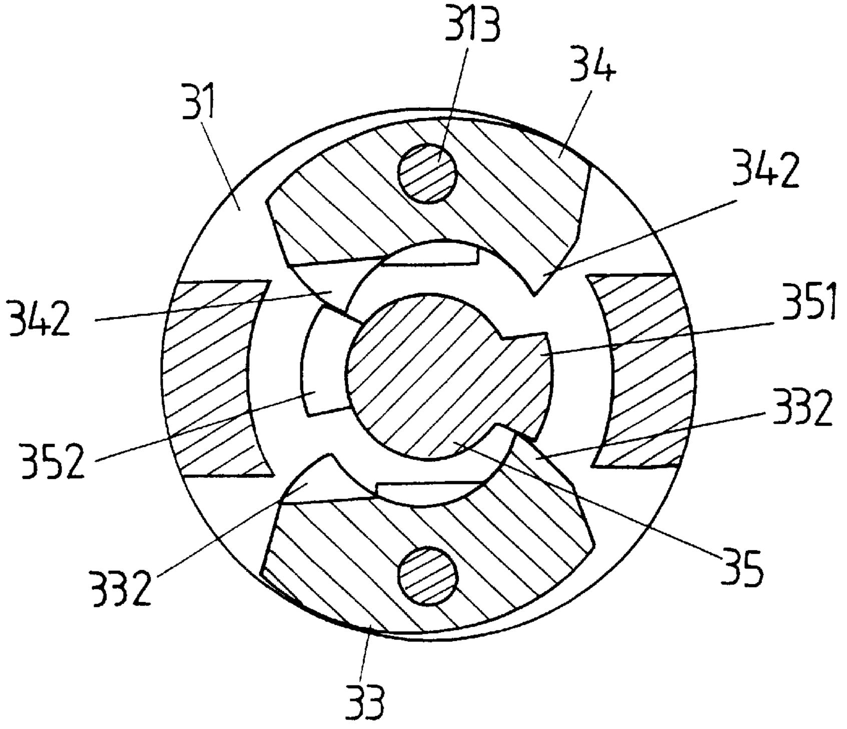
FIG. 5 is a cross-section view showing the drive unit of the present invention.
Figure 6:
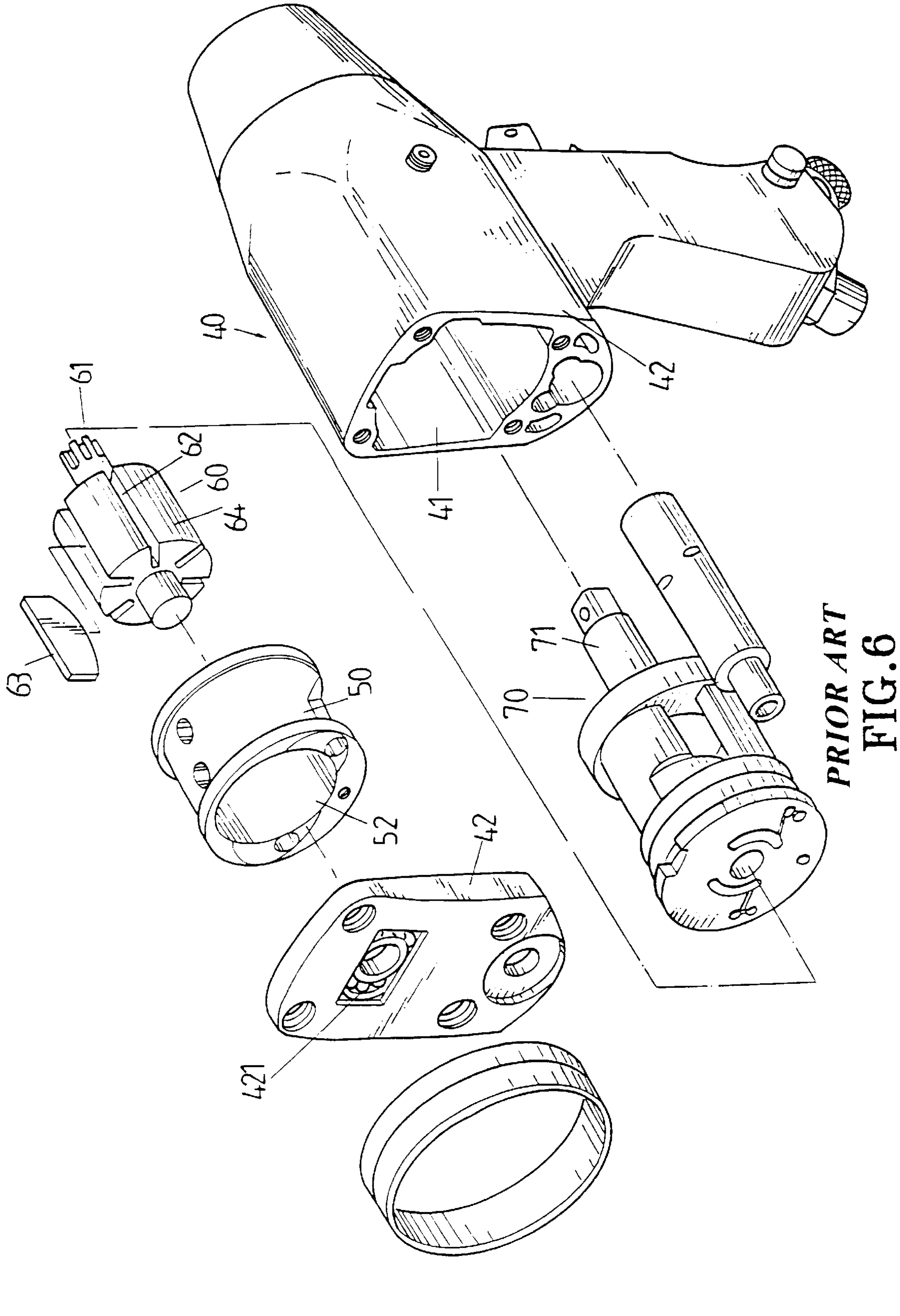
PRIOR ART FIG.6
FIG. 6 is an exploded view of the conventional air-tool.
Figure 7:
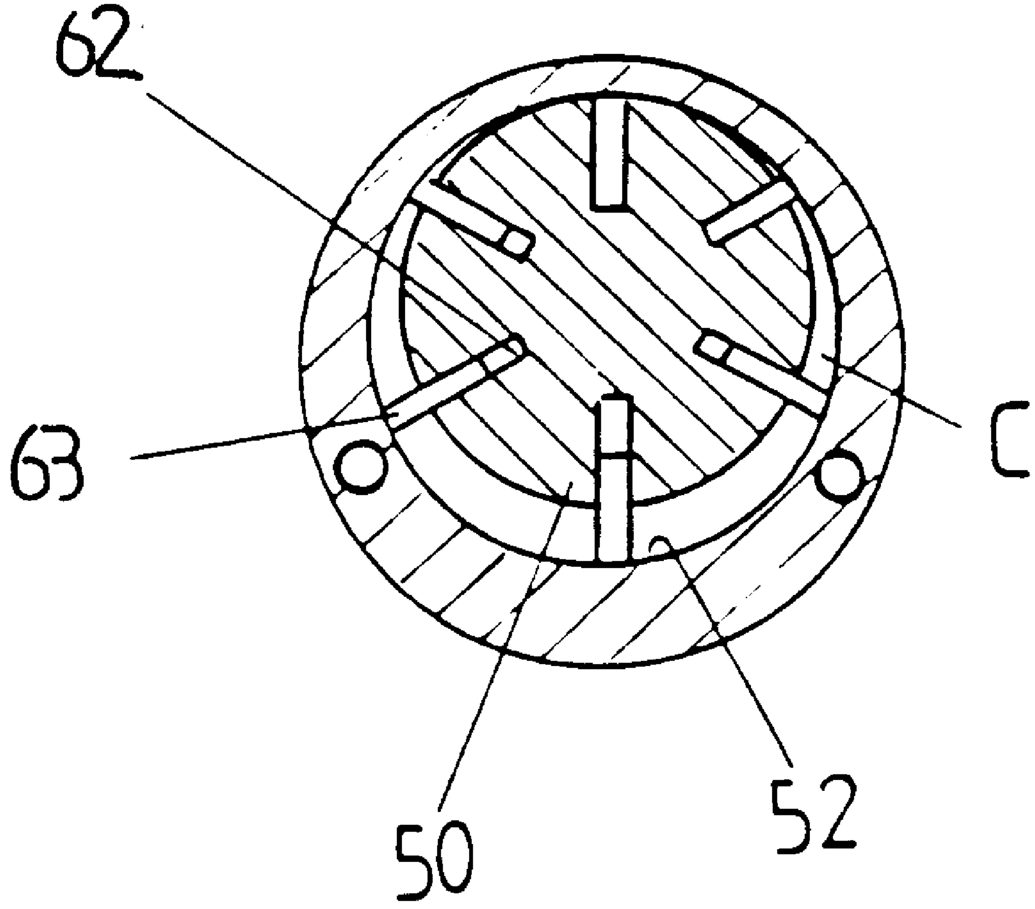
PRIOR ART FIG. 7
FIG. 7 is a cross-section view showing the rotary vane motor of the conventional air-tool.

Referring to FIG. 1, the rotary vane motor of the present invention has a rotor 10 mounted into a chamber 22 of a pneumatic cylinder 20 slightly off-centre by fitting into a bearing with a pivot 11 at one end and joining into a drive unit 30 with a spline shaft 12 at another end; the rotor 10 has a symmetrical number of radial slots 14 fitted with sliding vanes 15 on the rotor shaft 13. The feature of the present invention is to build symmetrical front face recesses 16 on the surface of the rotor shaft 13 between the slots 14 axially to form a front face separator fin 17 between the two adjacent front face recesses 16; said vane 15 has a notch 151 holding an elastomer 18 in for pushing the vane 15 outward formed at the bottom edge inserting into the slot 14; said drive unit 30, as shown on FIG. 3 to FIG. 5, includes a torque frame 31 having a cavity 311 holding a driving plate 32 in at the end nearing the rotor 10; the driving plate 32 has a central spline hole 321 for connecting with the spline shaft 12, and a couple opposite grooves 322; on the rim of the torque frame 31 there are two couple opposite pivot holes 312, therein two torque blocks 33, 34 are pivoted in the cavity 311 on two pins 313 mounted in the pivot holes 312 separately and oppositely, and connect to the driving plate 32 by fitting into the grooves 322 with one ends of them respectively; said torque blocks 33, 34 extend two thrust lugs 332, 342 to the both sides respectively and staggeringly so that when they are mounted on the torque frame 31, the thrust lugs 332, 342 are staggering, meanwhile a driving rod 35 is set into the central space of the torque frame 31 between of the two torque blocks 33, 34, said driving rod 35 has two bear lugs 351, 352 formed on the trunk coordinating to the thrust lugs 332, 342 for touching against them separately in order to carry over moment.

In the present invention, increasing the front face area of the rotor 10 in two ways, one is to form front face separator fins 17 on the rotor shaft 13, the another is to push the vanes 15 up so that the out edges of vanes 15 touch against the wall of the chamber 22 of the pneumatic cylinder 20; when the compressed air enters the chamber 22 through the inlets 21 of the pneumatic cylinder 20, the rotor 10 can be blown up to run immediately to eliminate the lag phase, meanwhile to increase the torsional moment on the rotor 10. On the other hand, besides increasing the front face area, the front face recesses 16 built on the rotor shaft 13 also can reduce the weight of the rotor 10, further to decrease the weight resistance moment as starting. On the vanes 15, the elastomer takes the place of the lubrication to keep the vanes sliding more smoothly, and avoids the vanes blocked by heaping up the dirty dust or the over viscosity resistance of the lubricating-oil. The torsional moment outputting from the rotor 10 is transferred to the driving plate 32 by connecting the spline shaft 12 of the rotor 10 into the spline hole 321, by means of thrusting driving rod 35 with the two thrust blocks 33 34, the double stronger torsional moment to exerting on the conventional driving rod is carried over the driving rod 35(referring to the single torsional moment of the prior art about 220 lb.-in, but 400 lb.-in in the present invention), meanwhile transferring the moment in the double sides can eliminate the vibration caused by single side done, further to reduce the striking to improve the service life and safety.

In one word, the present invention increases the front face area to improve the torsional moment on the rotor by building front face recesses and fins and pushing the vanes out with an elastomer in the rotary vane motor unit; in the drive unit, depend on the opposite thrust blocks and the staggering arranged thrust lugs pushing the bear lugs on the driving rod, the structure intensity and the outputting torsional moment are improved obviously.

I claim:

1. An air driven motor for a tool having (a) a pneumatic cylinder secured to the tool, (b) a rotor eccentrically disposed within a through bore of the pneumatic cylinder for rotation therein, the rotor having a plurality of angularly spaced slots formed therein, and (c) a plurality of sliding vanes respectively displaceably disposed in the plurality of slots and outwardly biased for contiguous contact with an inner surface of the pneumatic cylinder and establish respective compressed air contact surface areas that provide a rotational driving force on the rotor, the improvement comprising a plurality of fixed separator fins located between respective pairs of the plurality of slots of the rotor, each of said separator fins being formed within a respective cross-sectionally V-shaped recessed area for contact against a surface thereof by compressed air to add additional compressed air contact surface areas and thereby increasing the rotational drive force on the rotor, a radial diameter of a pair of radially opposing separator fins being substantially equal to a diameter of the rotor, each of the sliding vanes having a notch formed in a bottom edge thereof and an elastic element disposed in said notch for providing the outward bias of the sliding vane.

* * * * *